United States Patent [19]
Laidig et al.

[11] Patent Number: 5,588,521
[45] Date of Patent: Dec. 31, 1996

[54] METHOD AND APPARATUS FOR MATERIAL HANDLING

[75] Inventors: Jon Laidig; Dale Updike; Alan Amick, all of St. Joseph County, Ind.

[73] Assignee: Laidig, Inc., Mishawaha, Ind.

[21] Appl. No.: 463,766

[22] Filed: Jun. 5, 1995

[51] Int. Cl.$^6$ .................................................. B65G 47/19
[52] U.S. Cl. .................. 198/532; 198/550.9; 198/550.1; 198/675
[58] Field of Search ...................... 198/530, 532, 198/550.2, 550.6, 550.9, 550.1, 674, 675, 359, 363, 364, 368

[56] References Cited

U.S. PATENT DOCUMENTS

| | | | |
|---|---|---|---|
| 711,632 | 10/1902 | Johnson | 198/532 |
| 854,377 | 5/1907 | McQueen | 198/532 |
| 937,180 | 10/1909 | Ridd | 198/532 X |
| 5,183,147 | 2/1993 | Callahan et al. | 198/532 X |

OTHER PUBLICATIONS

Wennberg (KLM, Inc.), The Wennberg A–Frame Storage Building, pp. 1, 17 and 18 (No Date).
Miller Hofft, Inc., The Type "H" Unloader, pp. 4 and 5 (No Date).
Kone Corp. Engineering Division, Kone Screw Reclaimer (No Date).
RETEC, Inc., Enclosed Storage Systems, p. 5 and 2 Others Unnumbered, Jan. 1984.
Clarke's Industries, Inc., Bulletin FMDL 387–1M, Jan. 1984.
Consilium Bulk, Inc., Bin Discharge Screw Arrangement, Drawing No. 336–E1–3, Jul. 18, 1989.

*Primary Examiner*—D. Glenn Dayoan
*Attorney, Agent, or Firm*—Ryan M. Fountain

[57] ABSTRACT

A material handling system is provided having a plurality of separately actuatable flow gates disposed between the storage bin and the unloading conveyor which are sequentially opened and closed by a sliding zipper-type cam member to carefully control the amount of material applied to the conveyor. A compact screw drive assembly is mounted within a hollow of the screw at one end and enables the screw to be initially operable at a low speed to provide a higher break away torque when starting the screw and to be then operable at a higher speed and lower torque during constant running of the screw. The drive assembly includes a reversible motor coupled to a speed reducing gear arrangement in the reverse direction such that the motor is run in reverse when starting the screw and then run in forward during constant running of the screw.

10 Claims, 12 Drawing Sheets

METHOD AND APPARATUS FOR MATERIAL HANDLING

BACKGROUND AND SUMMARY OF THE INVENTION

The present invention relates to methods and apparatus for handling particulate, granular and fluidized material, and, more particularly, for unloading large storage bins and receptacles of such material onto a conveyor.

Particulate, granular and fluidized materials, such as grain, soy beans, bark, wood chips, coal and the like, are typically stored in large bins or receptacles. These bins can be static structures measuring over a hundred feet in length and/or width and being several stories high. Particulate matter is, for example, discharged into the top of the bin via a conveyor and allowed to pile up inside. When it is desired to reclaim the particulate matter from the bin, front end loaders or undercutting auger screws are often employed.

Front end loaders have the advantages of requiring minimal capital investment and of simplicity and flexibility of operation. Various different cargo receiving vehicles, such as ships, trains, dump trucks and the like, can be served by a front end loader. However, front end loaders can be dangerous to operate in the environment of particulate matter bins. Undercutting the material pile can, for example, cause the overhang to collapse onto the operator of the front end loader. To decrease such risks in that type of loading arrangement has required greater manpower effort and operational expense.

As an alternative, auger screws have been mounted on rails or tracks at the bin sides so to move back and forth through the pile of material at the base of the bin while rotating about an axis laterally across the width of the bin. Depending upon the width of the bin, either a single screw can extend from one side to the other or two screws are employed which extend from each side to join at the center of the bin floor and are supported at that junction on a meridian track running the longitudinal length of the bin as well. The side tracks are typically mounted in sheds or enclosures formed beside or within the base, and the meridian track is typically mounted beneath a cover or central enclosure of the bin.

Such enclosures serve to contain the motors and drive mechanisms for the screw and keep particulate matter off of the track. Further, motion of the screw directs the particulate matter to one or more conveyors which are also located in one or more of these enclosures. Typically, these conveyors extend the entire length of the bin and outwardly to the vehicle to be loaded. The screws pass through a permanent opening in the enclosures to enter the bins and that same opening is usually employed to permit particulate matter agitated by the screws to leave the bins and fall onto the conveyors. Thus, the conveyors are intended to provide a steady flow of material with a minimum of manpower demands.

However, since the openings of the enclosures extend for far longer that the radial dimensions of the screws, once the screw uncakes the particulate matter adjacent those openings, the flow of matter onto the conveyor can continue for a significant period of time after the screw travels onward. Especially for fluidized material, such as bean meal, this can result in a loss of control of the amount of material applied to the conveyor. As a result, the conveyor can be subject to excessive weight and/or volume loads, and thereby jam or break down. It has been suggested that various special conveyor configurations, such as chain conveyors, can be used to better resist these problems, but such conveyors typically cost more initially and operationally, as well as require a slower material loading flow rate.

Moreover, there are a number of significant design restrictions on such material unloading arrangements that limit the availability of alternative solutions. For example, due to the dusty nature of some materials (and over time the same bins can be used for a variety of materials), it is commonly necessary to make the screw drive devices "explosion proof." Also, since the screws are not always operational, the structure must be capable of sustaining the material weight during non use and start up against a high rotational load. Further, given the large distances between components that must move in unison, proper alignment must be maintained to prevent components from binding.

Other disadvantages of prior auger screw arrangements arise because of the need for side and meridian enclosures. Prior drive mechanisms have been mounted outside of the auger screw, and were often very large due to the large torque needed at screw start up even though lower torques can be used during subsequent operation. As a result, the enclosures also needed to be large, sometimes formed as whole side or meridian rooms of the bin. In addition to requiring greater cost of construction, these rooms detracted from the amount of space available for material storage.

Accordingly, it is an object of the present invention to provide an improved method and apparatus for handling of particulate, granular and/or fluidized material. Other objects include the provision of a method and apparatus which:

1. can be readily retrofit to existing storage bins with a minimum of reconstruction;
2. is reliable and cost efficient both in initial cost and in operational cost;
3. is compact in design so as to minimize spacial requirements within the storage bin;
4. permits greater control over the amount of material applied to the conveyor;
5. is flexible in its application so as not to preclude concurrent or alternative use of front end loaders to reclaim portions of material alternatively of simultaneously; and
6. minimizes the incidences and severity of binding or jamming in operation.

These and other objects of the present invention are attained in a material handling system having a plurality of separately actuatable flow gates disposed between the storage bin and the unloading conveyor which are sequentially opened and closed by a sliding "zipper" cam member to carefully control the amount of material applied to the conveyor. A compact screw drive assembly is mounted within a hollow of the screw at one end and enables the screw to be initially operable at a low speed to provide a higher break away torque when starting the screw and to be then operable at a higher speed and lower torque during constant running of the screw. The drive assembly includes a reversible motor coupled to a speed reducing gear arrangement in the reverse direction such that the motor is run in reverse when starting the screw and then run in forward during constant running of the screw.

Other objects, advantages and novel features of the present invention will now become readily apparent to those skilled in the art from the following drawings and detailed description.

DESCRIPTION OF PREFERRED EMBODIMENTS

Figure 1:
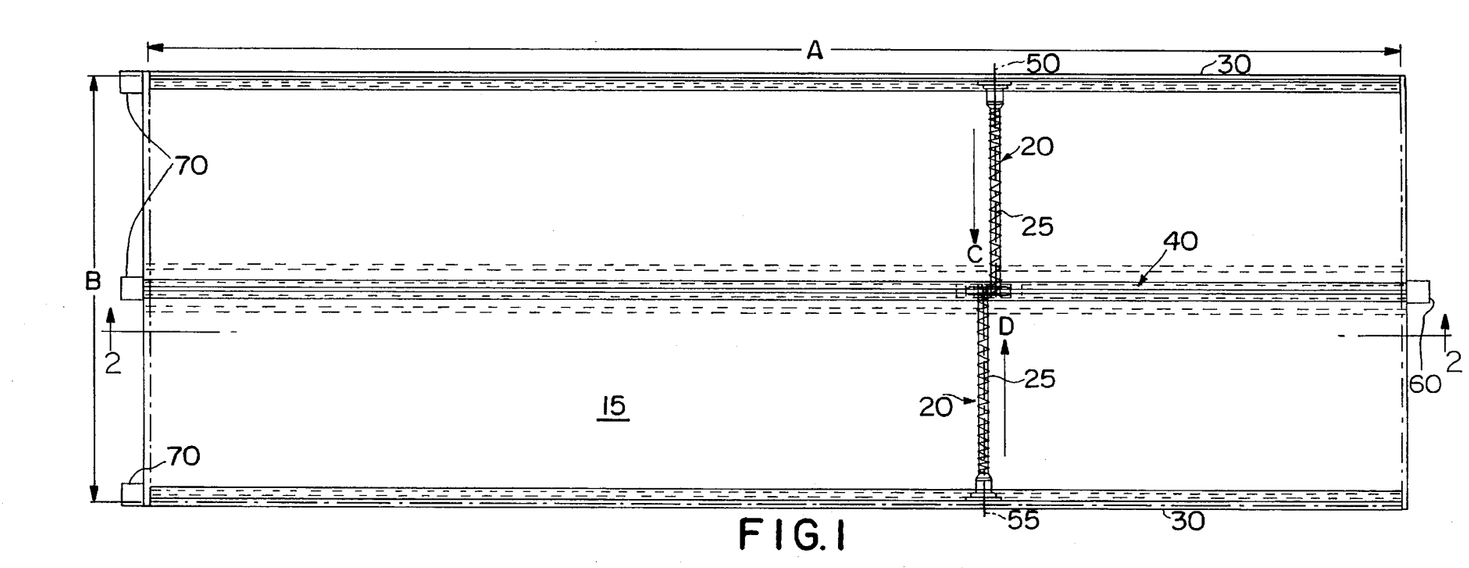
FIG. 1 shows a top plan view of a material handling system according to the teachings of the present invention as mounted within a material storage bin or receptacle.
Figure 2:
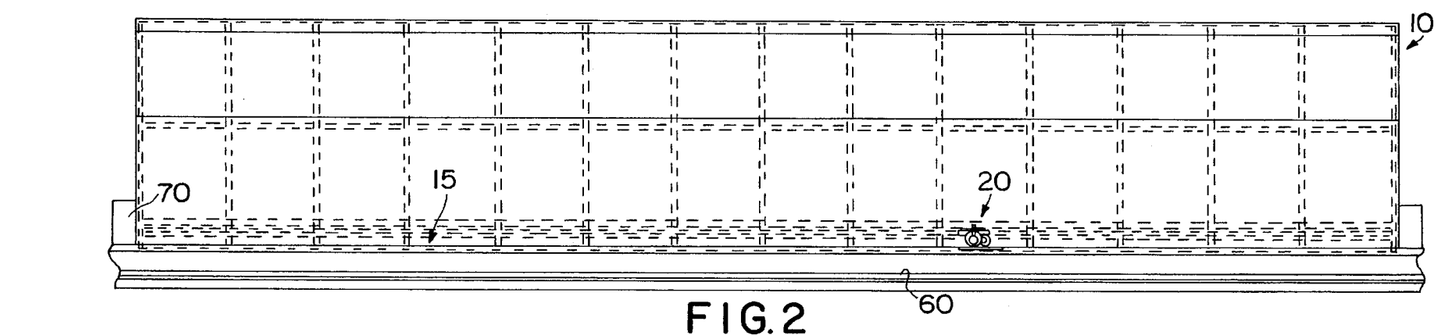
FIG. 2 shows a side elevational view of the embodiment of FIG. 1 along lines 2—2 of FIG. 1.

FIGS. 1 and 2, which illustrate a preferred embodiment of the present invention, show a large bin or receptacle 10 for particulate, granular and/or fluidized matter having an undercutting auger screw arrangement mounted at its base or floor 15 for unloading material stored therein. Bin 10 can, for example, be 280 feet in longitudinal length A and 100 feet in lateral width B. With the present invention, a pair of auger screws 20, each approximately 50 feet in length are mounted from sides 30 to meridian 40. These screws traverse length A in unison while rotating about their respective rotational axes 50 and 55. Screws 20 each include a blade-like projection or screw threading 25 formed on a preferably cylindrical or tubular surface 27. The direction of rotation of screws 20 is such that threading 25 on each screw causes material in contact with it to more toward meridian 40 in directions C and D. A conveyor 60 is disposed at meridian 40 to receive that material and remove it from bin 10. Drive motors 70 of conventional design can be mounted outside of bin 10 to control longitudinal movement of the screws and advancement of the conveyor.

Figure 3:
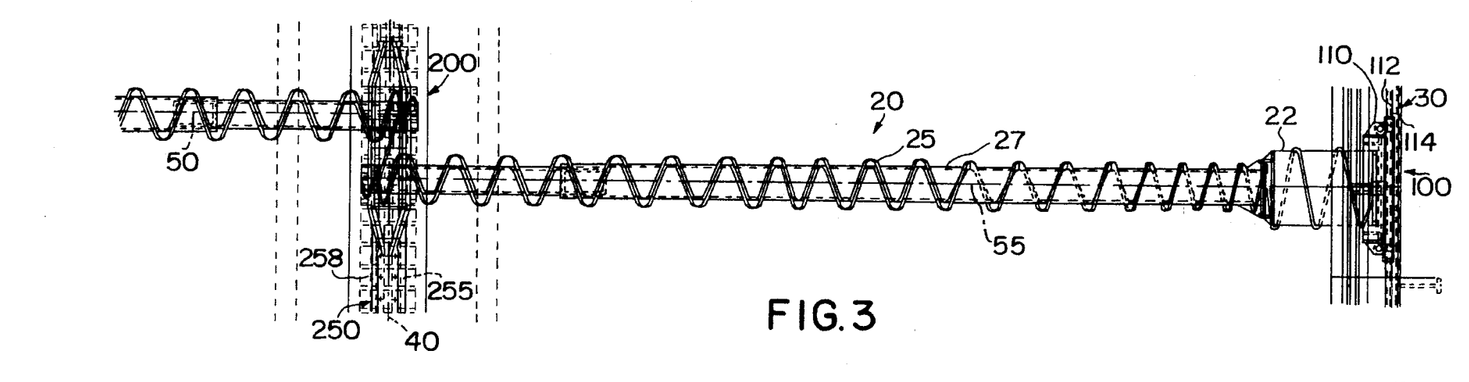
FIG. 3 shows an enlarged, partial top plan view of one of the auger screw arrangements in the embodiment of FIG. 1.
Figure 4:
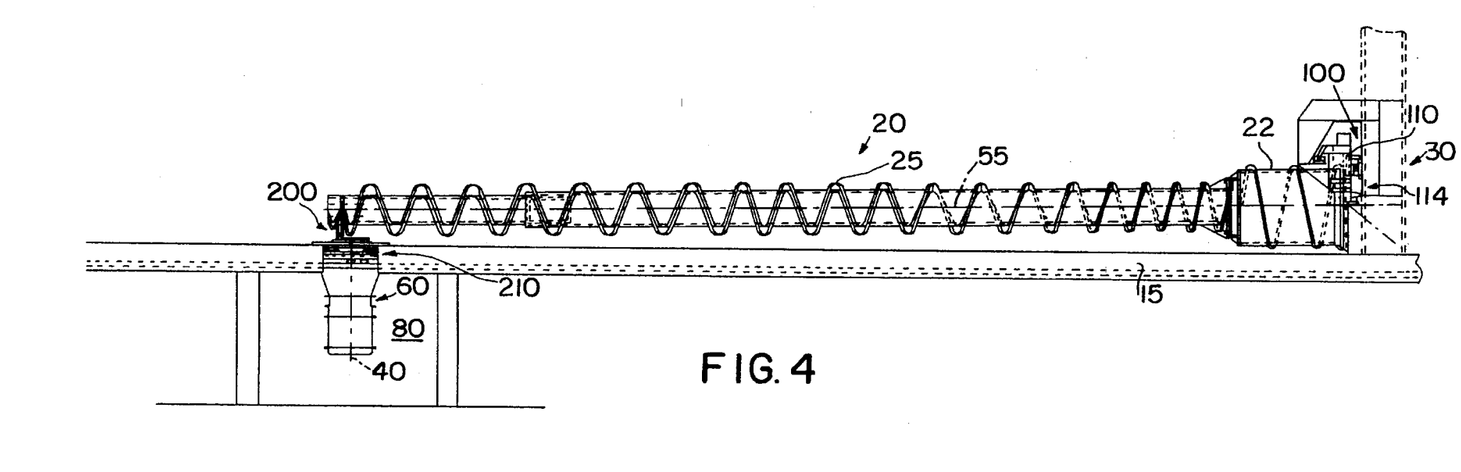
FIG. 4 shows a side elevational view of the features of FIG. 3.

As shown in FIGS. 3 and 4, screws 20 are mounted on a track assembly 100 at sides 30 and supported on a movable truck 200 at meridian 40. Track assembly 100 is mounted, for example, onto the sides of bin 10 and includes a rolling carriage 110 pulled by a chain or cable 112 along a track 114 extending the length of bin 10. Chain pull gears to move carriage 110 can be included at drive motors 70 in a conventional manner.

Screws 20 are mounted to truck 200 at their central junction in a longitudinally offset orientation. Truck 200 is preferably moved along the length of bin 10 by a conventional chain or cable drive similar to and synchronized with that of chain 112 and drive motors 70. Truck 200 is mounted at meridian 40 on a track assembly 210 over a recess 80 in bin floor 14. Conveyor 60 is, for example, disposed below truck 200 in recess 80. Preferably, track assembly 210 and conveyor 60 are conventional, pre-existing unloading structures to which the present invention can be retrofit. Unlike prior devices, however, a plurality of flow gates 250 are mounted below truck 200 and above conveyor 60. These flow gates include a pair of opposing gate doors 255 and 258, arranged side by side for the longitudinal length of travel of truck 200.

Opposite the central junction of screws 20 and adjacent track assembly 100, an enlarged portion 22 of screws 20 is preferably formed. This enlarged portion includes a hollow interior 24 for receiving rotational drive assembly 300 of each screw.

Figure 5:
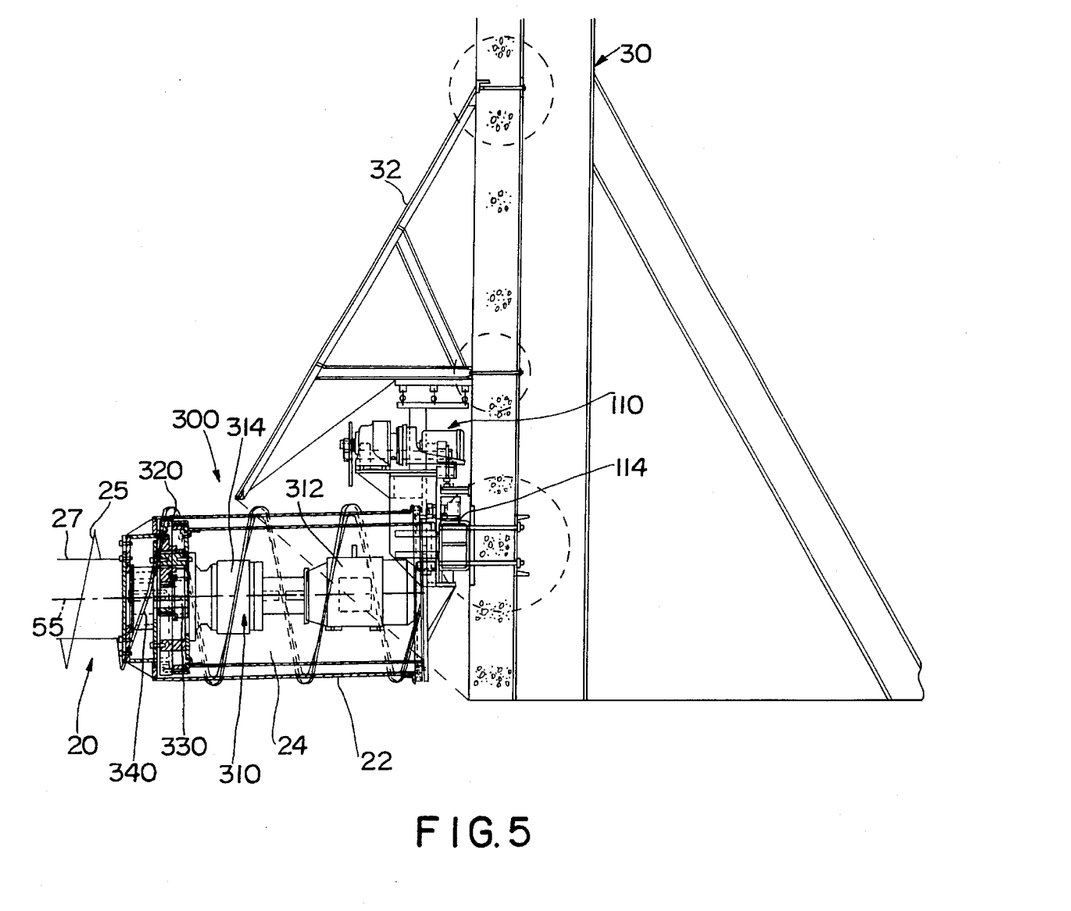
FIG. 5 shows a further enlarged, cross sectional side view of the drive assembly of FIG. 3.

As shown in FIG. 5, enlarged portion 22 and track assembly 100 is sheltered by overhang 32 on sides 30. A larger enclosure for the screw drive assembly 300 and rolling carriage 110 is not necessary with the present invention because of the compact arrangement of drive assembly within the screw. Drive assembly 300 includes drive motor 310, gear drive 320, forward clutch 330 and reverse clutch 340. Motor 310 can be electric, hydraulic or pneumatically powered as desired in particular applications. Preferably, motor 310 is reversible by a conventional control means incorporated therein and can supply about 50 horsepower at 28 rpm during steady, normal operation. Power can be supplied to motor 310 by a bus bar or cable along the length of side 30.

Figure 6:
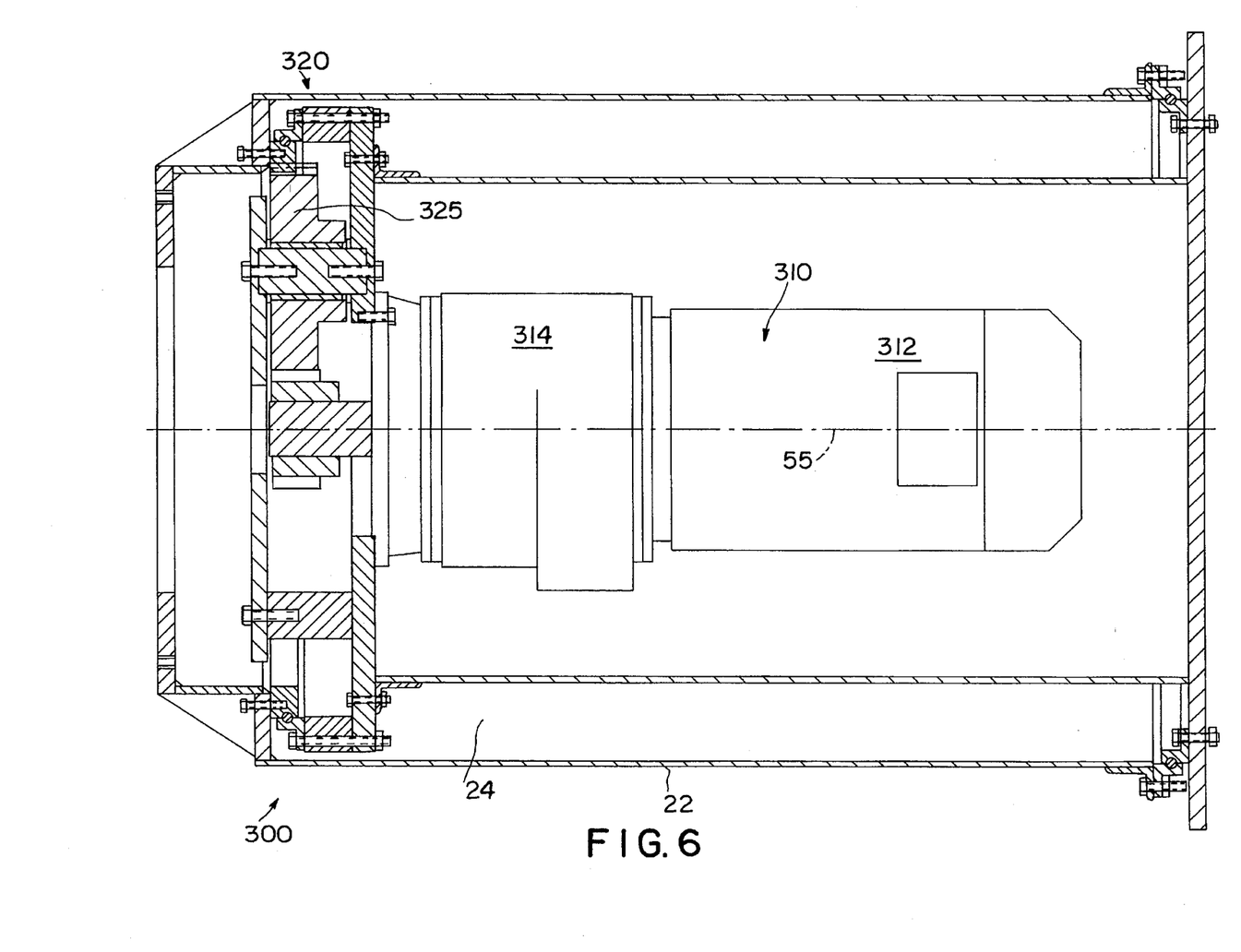
FIG. 6 shows a still further enlarged, cross sectional side view of the gear drive and housing of FIG. 5.
Figure 7:
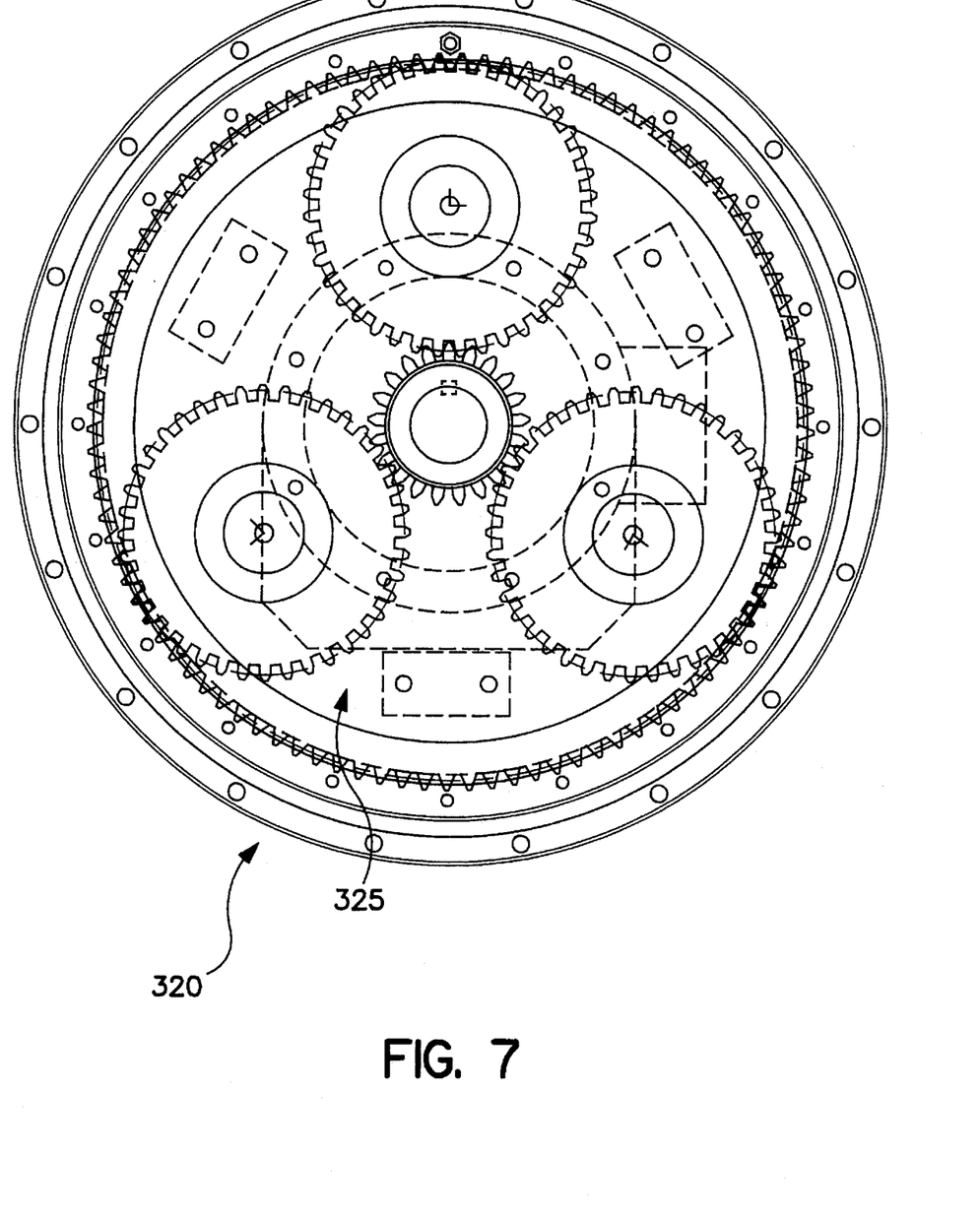
FIG. 7 shows an end view of the gear drive of FIG. 6.

Gear drive 320 includes, for example, a planetary gear set 325 with a four to one reduction in rotational speed. The planetary gear set is disposed to drive screw 20 when motor 310 is rotating in reverse. Clutch 340 is mounted to lock in when motor 310 is in reverse such that forward rotational power is transmitted to screw 20 from planetary gear set 325. At the same time, clutch 330 is overriding when motor 310 is rotating in reverse. On the other hand, when motor 310 is rotating in forward, clutch 340 is overriding and clutch 330 locks in to transmit forward rotational power from motor 310 to the screw.

During operation of the present invention, motor 310 would typically be operated in reverse when the auger screw is first started up after remaining idle for a period of time, or when otherwise subject to excess material compaction. In the example given above, the four to one reduction of motor speed to a 7 rpm speed at screw 20 permits greater torque to be applied to tear away from the material that has compacted around the screw. After that start up, motor 310 is then run forward, with screw 20 continuing to run forward, but at the higher, normal 28 rpm speed, to supply conveyor 60. Thus, with the present invention it is not necessary to employ a higher power motor 310 in order to provide sufficient torque to screw 20 at all times. Accordingly, smaller wiring and motor ventilation equipment can also be used to provide further space savings. Further, mounting drive assembly 300 within screw 20 provides a more explosion resistant construction in that material dust is further isolated from any source of heat or spark. That interior mounting also permits a more compact overall construction such that less usable space is consumed by the apparatus within bin 10. Further, a smaller motor construction can mean a significant reduction in system weight, such that stress and wear are also reduced and the useful life of the system is increased.

It should be readily understood by those skilled in the art that the discussion above has been simplified to focus more on the inventive features per se. Obviously, other structure can be employed in combination with the present invention as desired in particular situations. For example, motor 310 could advantageously be formed by an electric motor component 312 and a speed reducing gear box component 314 attached thereto prior to connection with planetary gear set 325.

Figure 8:
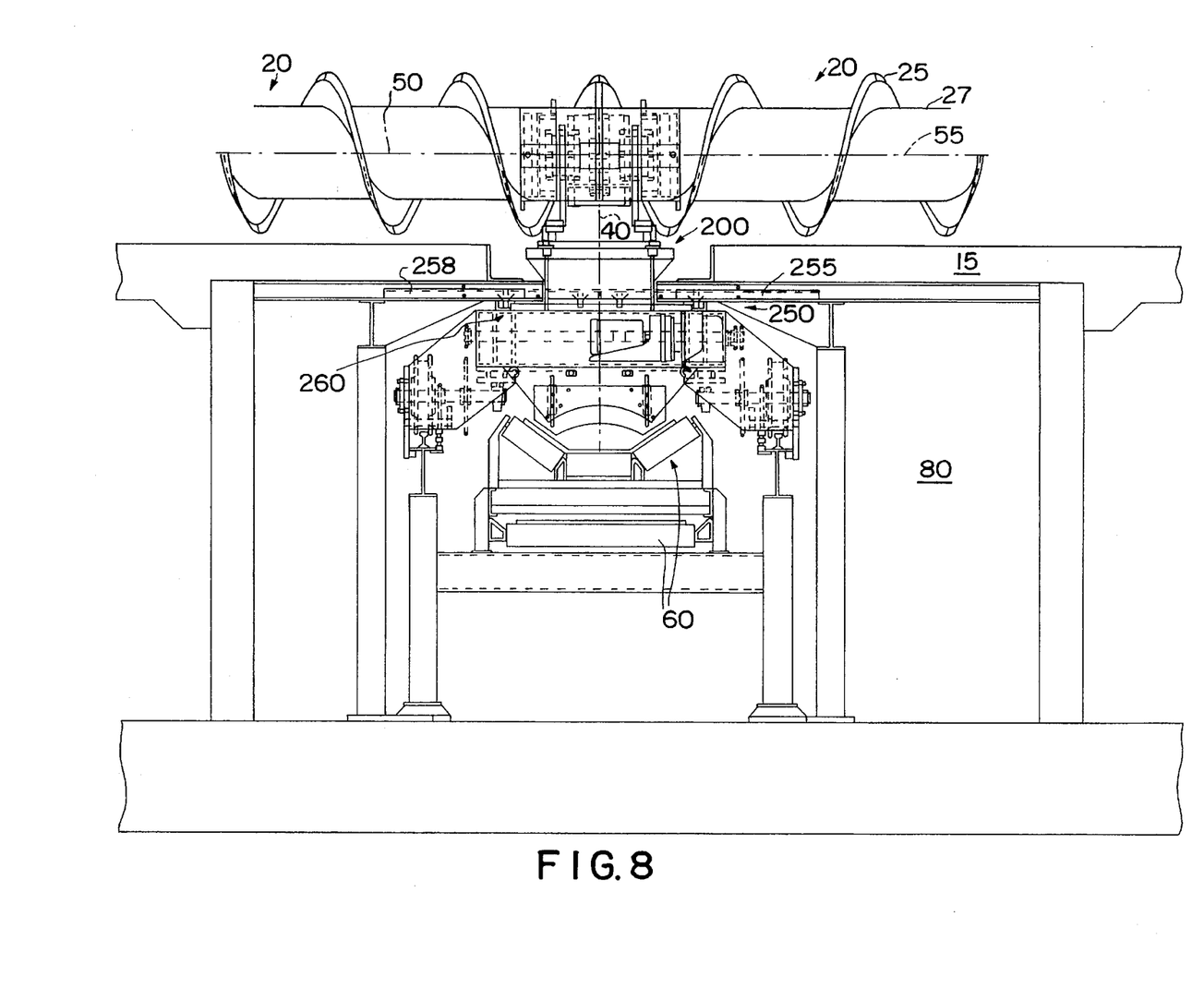
FIG. 8 shows an enlarged, cross sectional side view of the meridian section of the auger screw junction of the embodiment of FIG. 1.

As shown in FIG. 8, the junction of screws 20 coming in from each side 30 at meridian 40 is supported by truck 200. Beneath truck 200 are a series of flow gates 250 to control the passage of material fed to the meridian by screws 20. A cam member 260 is mounted below flow gates 250 to actuate the individual doors of the flow gates in a manner that resembles a zipper. Conveyor 60 is disposed below cam member 260 to receive material passing through the flow gates and transport it out of the bin in a conventional manner. Accordingly, truck 200 and cam member 260 are preferably formed as open frame devices to provide minimal impedance to the flow of material therethrough.

Figure 9:
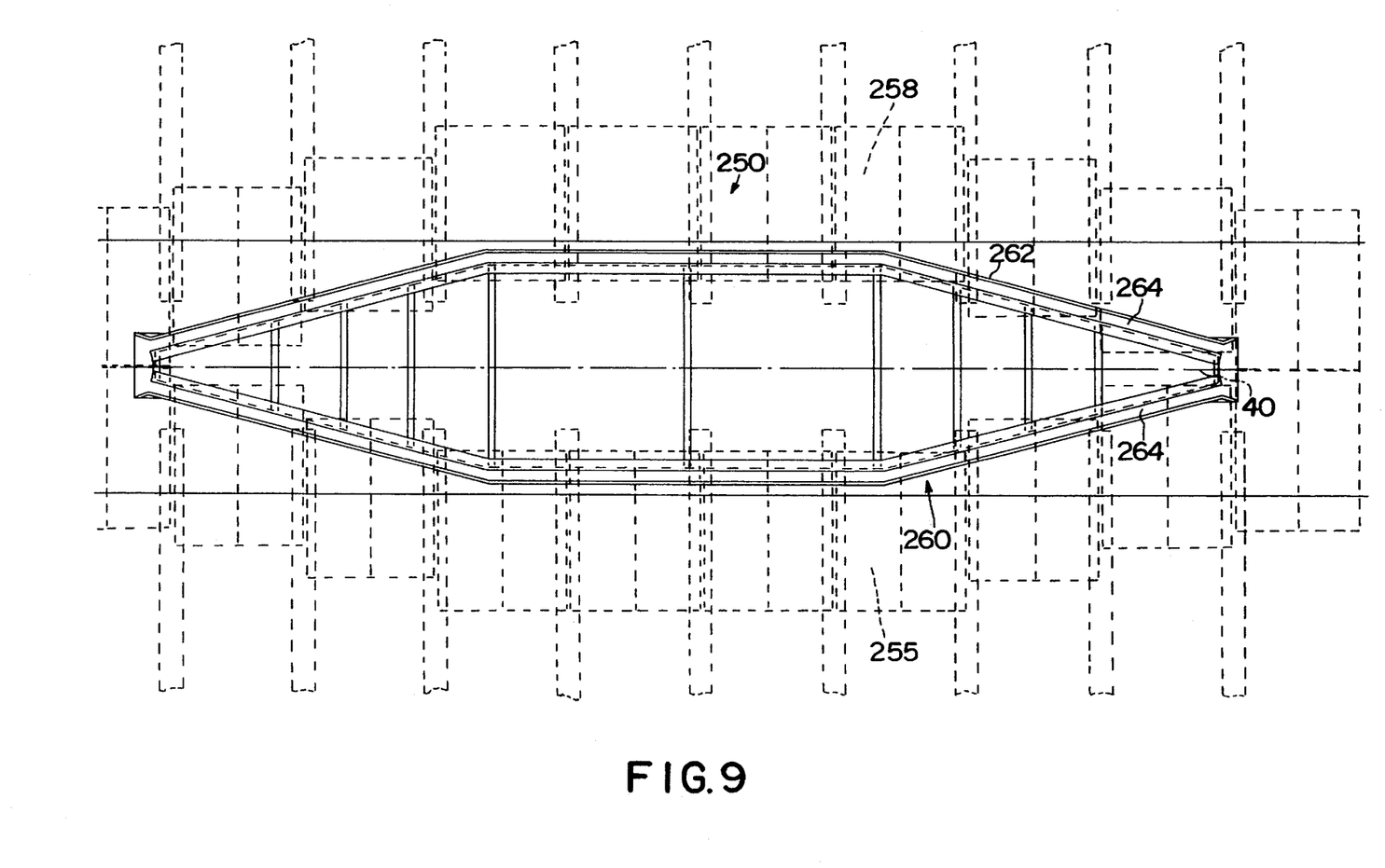
FIG. 9 shows a top view (rotated 90 degrees) of the zipper cam of FIG. 8 with respect to the flow gate doors.
Figure 10:
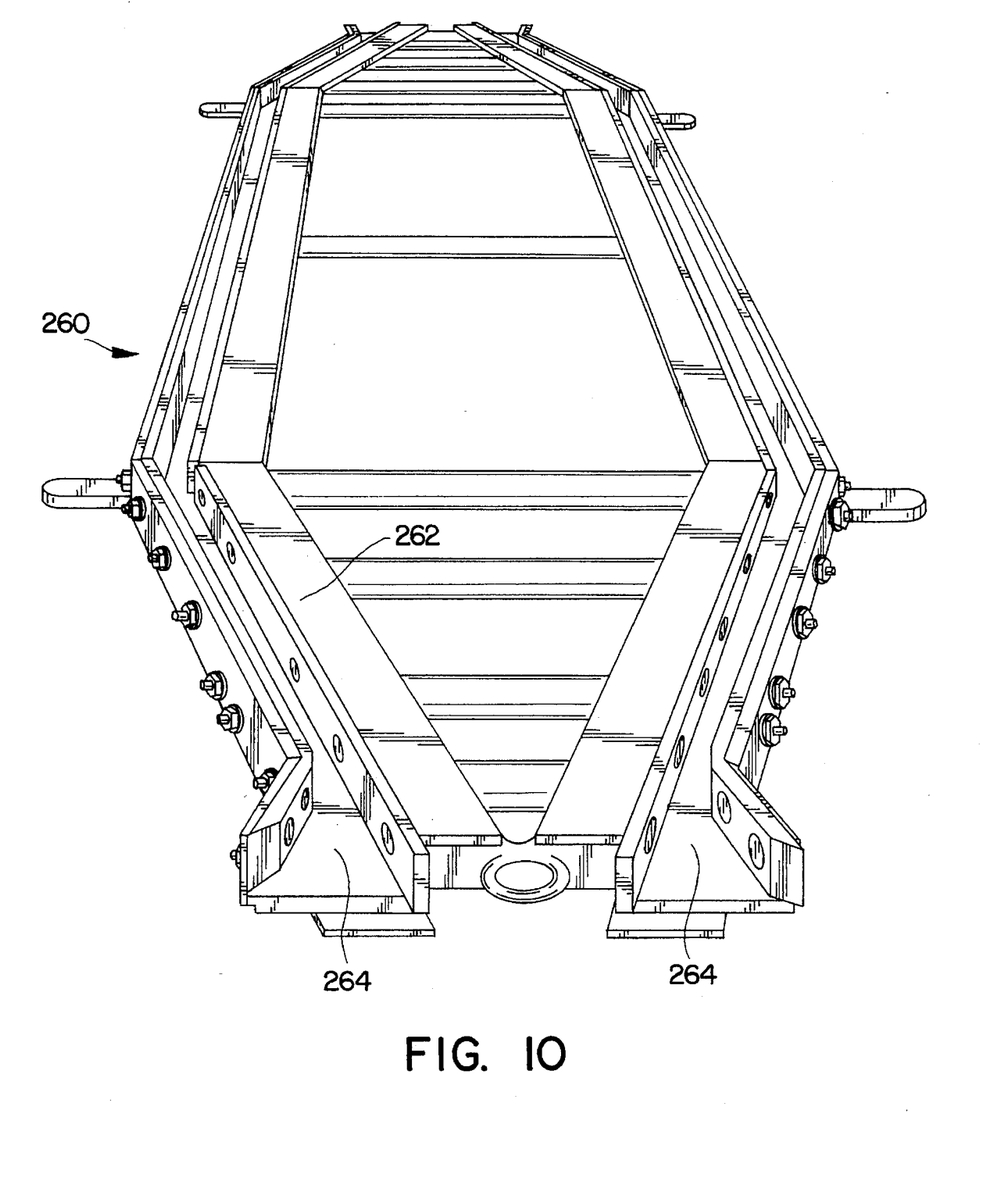
FIG. 10 shows a top, side perspective view of the zipper cam of FIG. 9.
Figure 12:
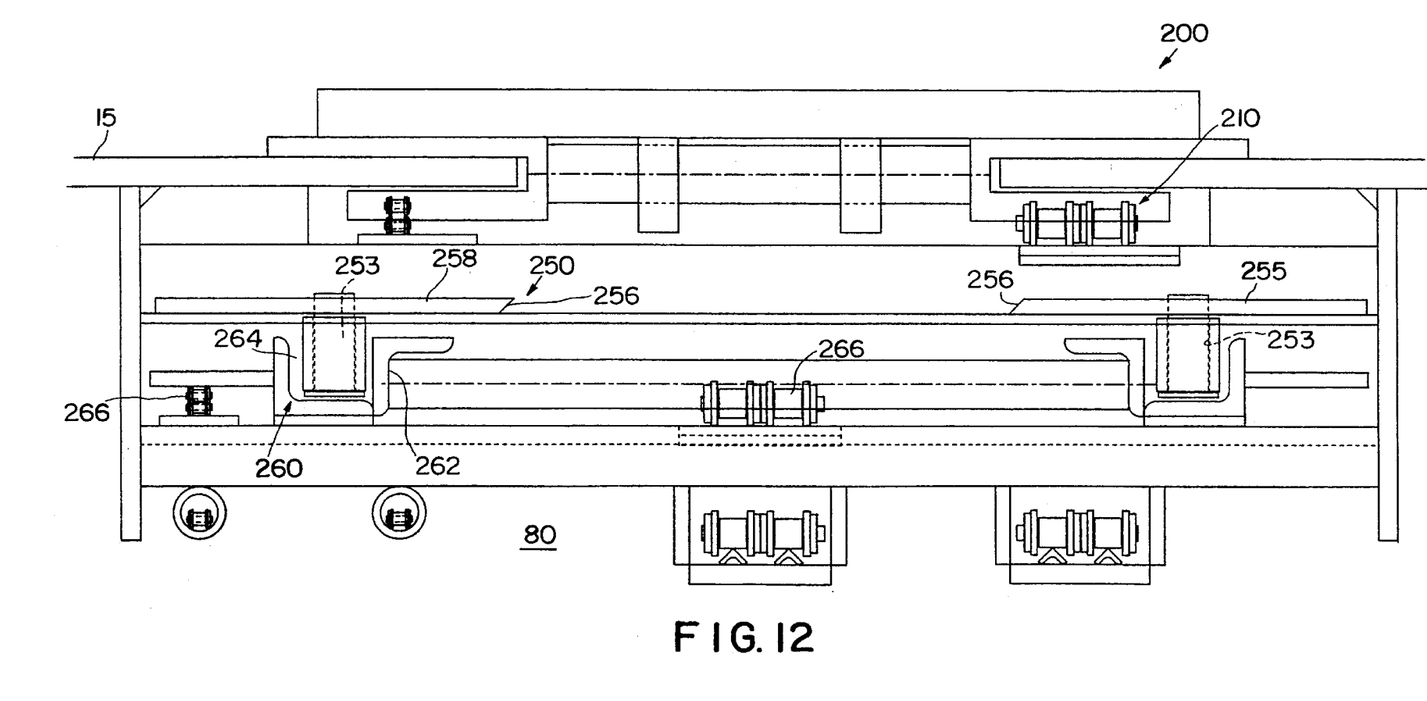
FIG. 12 shows a cross sectional side view of a simplified embodiment of the longitudinally moving components of the meridian section of the embodiment of FIG. 1.
Figure 13:
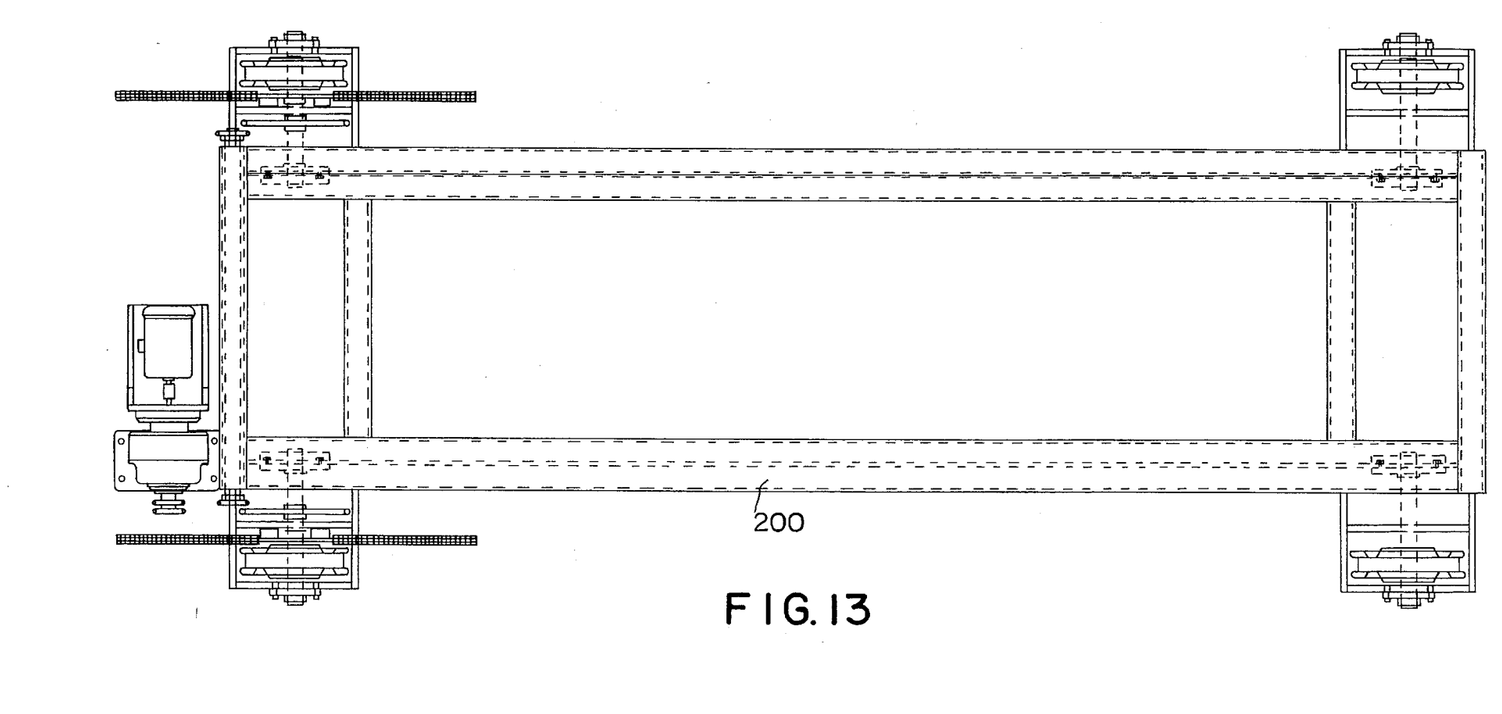
FIG. 13 shows a top view (rotated 90 degrees) of the auger screw truck of FIG. 8, without the auger screws in place.
Figure 14:
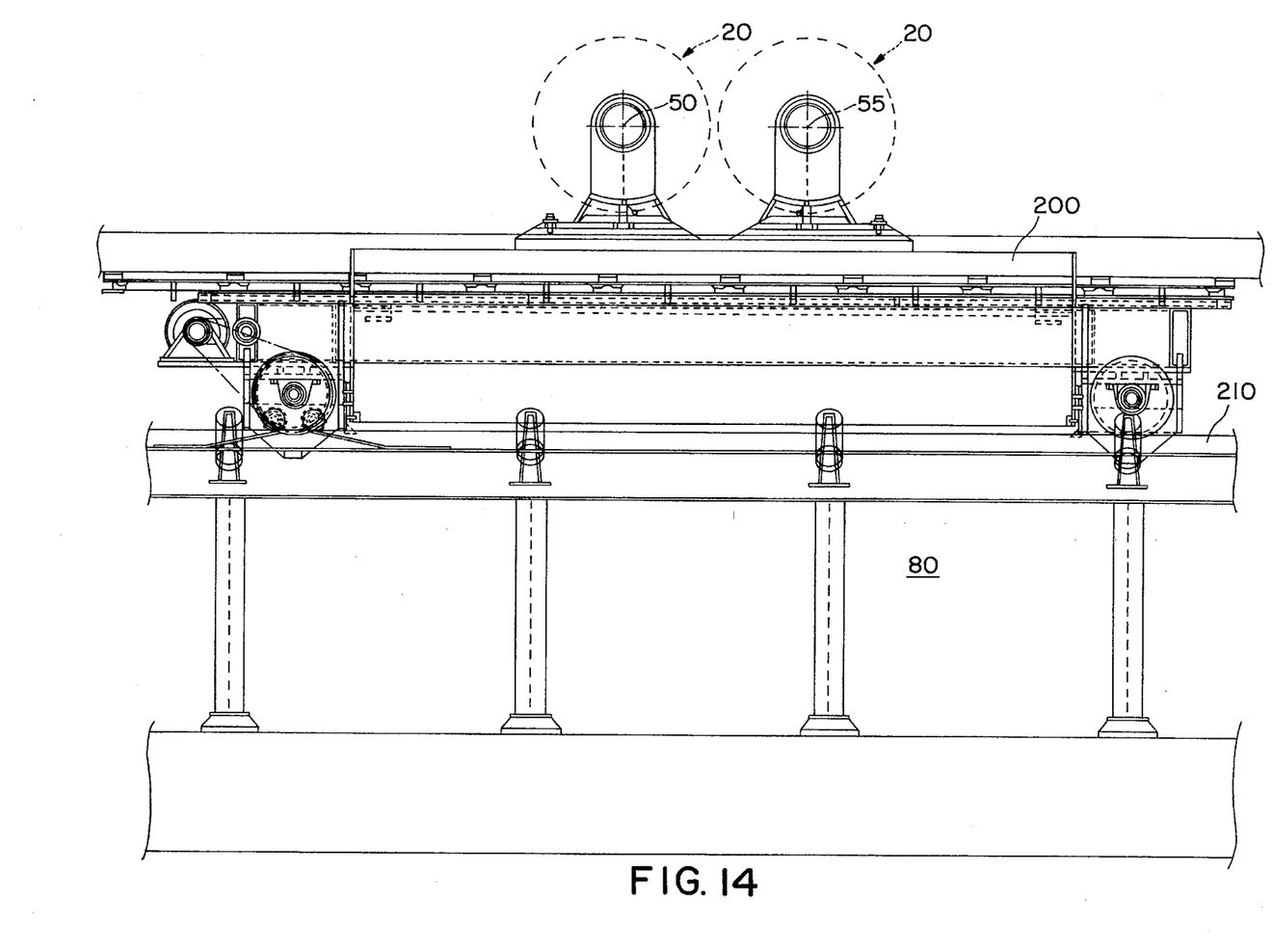
FIG. 14 shows a side view of the auger truck of FIG. 12, with the auger screws in place.

The nature of cam member 260 is best illustrated by the embodiments shown in FIGS. 9, 10 and 12. Cam member 260 is formed, for example, as a frame 262 having two camming tracks 264 therein. At each end of frame 262 these camming tracks come close together, but moving toward the other end of the frame those tracks initially diverge, then run parallel, and then converge to come close together again at the other end of the frame. Cam member 260 is preferably mounted as sled, pulled synchronously with truck 200, on rollers or chains 266, and parallel to the arrangement of flow gates 250.

Figure 11:
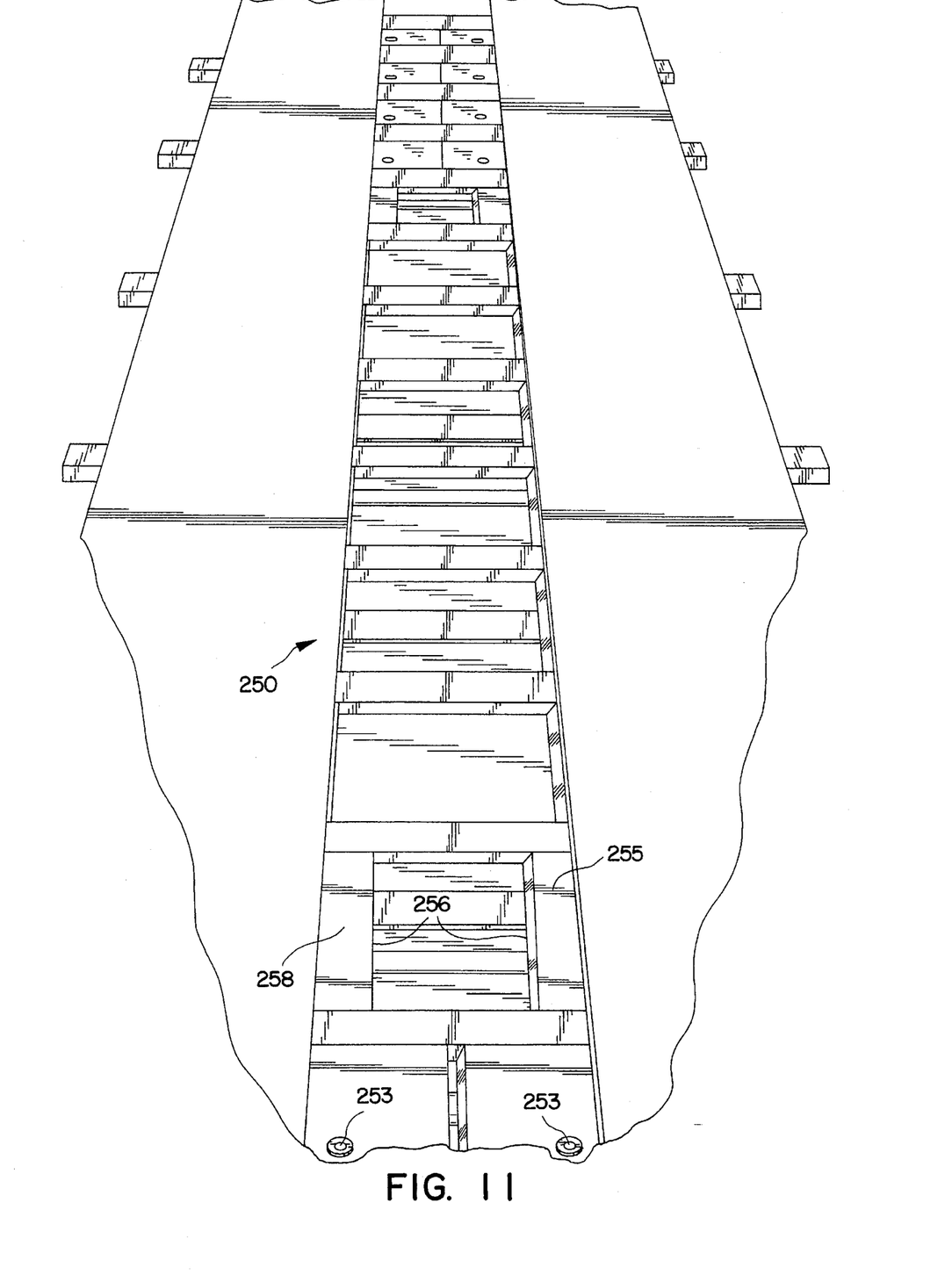
FIG. 11 shows a top, side perspective view of the flow gate doors as actuated by the zipper cam of FIG. 10.

Flow gates 250 are preferably mounted in a linear series running the length of conveyor 60 under bin 10. Each gate in the embodiment shown by FIGS. 9, 11 and 12, includes a pair of opposing gate doors 255 and 258. These doors open and close by moving laterally toward and away from sides 30, generally perpendicular to the direction of travel of truck 200. Each of doors 255 and 258 includes a downwardly extending projection or post 253 which is rigidly attached to the door such that moving the posts laterally causes the doors to move laterally. Preferably, posts 253 are disposed back from the joining edges 256 of doors 255 and 258 toward sides 30 so as to facilitate movement of each door. Posts 253 and camming tracks 264 are dimensioned relative to each other such that a plurality of posts 253 are slidable simultaneously within each of tracks 264, the result of which is shown in FIG. 11.

The dimensions and locations of flow gates 250 and cam member 260 are integrally related to establish the operational effect that cam member 260 sequentially opens and closes gate doors 255 and 258 separately as truck 200 moves over those doors. Accordingly, the convergence of tracks 264 at each end of frame 262 is established such that when posts 253 are first received within camming tracks 264 gate doors 255 and 258 are closed. As frame 262 is drawn further along meridian 40, camming tracks 264 diverge to force posts 253 to move laterally toward side 30, thereby opening gate doors 255 and 258. In preferred embodiments these doors are opened simultaneously and to the same degree, but the present invention contemplates alternative embodiments where the doors are opened independently in timing and degree, according to the path of post motion established by the camming tracks.

Once gate doors 255 and 258 are fully opened, camming tracks 264 run parallel, not forcing any further movement of posts 253. As truck 200 moves past the flow gates, camming tracks 264 converge to the point where posts 253 force the gate doors to fully close. The number and dimensions of gate doors held open under truck 200, can be selected as desired to establish whatever amount of material flow to conveyor 60 is desired in a particular instance. The present invention contemplates, for example, that with different materials stored in bin 10, different cam members 260 may be selected with minimal other change to the receptacle unloading system.

With the meridian arrangement of the present invention, no central enclosure is required. Instead, the screws can operate directly in the environment of the bin material. In some instances, a simple T-bar type of roof can be advantageously mounted over truck 200 to facilitate access for occasional system maintenance, but an extensive enclosure is not necessary by comparison with prior apparatus.

Those of skill in the art will now recognize that various conventional position and torque sensors can be readily employed with the present invention to prevent binding and tilt of system components by excessive material compaction and/or uneven bin floor and wall dimensions. Accordingly, forward motion of screws 20 by drive motors 70 can be decreased if it is detected that the rotational speed of screws 20 decrease (indicating an increase in material pressure applied to the screw). Further the present invention does not interfere with the use of front end loaders to remove small portions of material from the bin simultaneously or alternatively, thus maintaining greater operator flexibility. In short, the spirit and scope of the present invention extend beyond the specific embodiments described above, and are limited only by the terms of the claims below.

What we claim is:

1. An apparatus for controlling the flow of particulate, granular or fluidized matter between a storage receptacle and a conveyor, that apparatus being disposed between said receptacle and said conveyor and comprising:

a plurality of individually movable flow gates, each of which defines an opening between said receptacle and said conveyor, and a cam member sequentially engagable with said flow gates to selectively open and close said flow gates to permit said matter to move between said receptacle and said conveyor.

2. The apparatus according to claim 1 wherein each of said flow gates includes a pair of opposed gate doors, said doors each having projecting portions rigidly attached thereto and configured to be engagable with said cam member.

3. The apparatus according to claim 2 wherein said flow gates are arranged along the length of said receptacle and said doors are openable laterally of that length.

4. The apparatus according to claim 3 wherein said cam member is slidably mounted adjacent and parallel to the arrangement of said flow gates and engages a plurality of said flow gates simultaneously such that a plurality of said flow gates can be opened or closed at the same time.

5. The apparatus according to claim 4 wherein said cam member includes a plurality of camming tracks, each of which is engagable with said projecting portion of one of said doors of said flow gates to direct the motion of that door between open and closed positions, and said cam member is configured to permit the flow of said matter therethrough.

6. An auger screw apparatus for transporting particulate, granular or fluidized matter between a storage receptacle and a conveyor, said auger comprising:

a longitudinally extending, rotatable member having a continuously formed bladed projection disposed thereon as a screw-like threading along its length, said rotatable member including a hollow portion therein, and first drive means for selectively causing rotation of said rotatable member, said drive means being disposed within said hollow portion.

7. The apparatus according to claim 6 wherein said drive means includes an electric motor rotatable in a forward and a reverse direction, and includes a first and a second clutch, said first clutch being connected to said motor and said rotatable member such that when said motor rotates in said reverse direction said rotatable member is driven in said forward direction, and said second clutch being connected to said motor and said rotatable member such that when said motor rotates in said forward direction said rotatable member is also driven in said forward direction.

8. The apparatus according to claim 7 wherein said drive means also includes a reduction gear device connected through said first clutch to reduce the rotational speed of said rotatable member relative to said drive means in order to provide greater torque thereto.

9. The apparatus according to claim 8 also including control means connected to said drive means for initially operating said drive means in said reverse direction and then subsequently operating said drive means in said forward direction at the start of operation of said auger screw.

10. An undercutting auger screw apparatus for unloading a longitudinally extending bin of particulate, granular or fluidized matter, comprising:

a conveyor disposed in a lower portion of said bin and extending along the length of said bin, a plurality of individually actuatable flow gates disposed between said conveyor and said bin and extending along the length of said bin, at least one rotatable auger disposed in a lower portion of said bin and extending laterally of the length of said bin, said auger including a tubular member having a projection formed thereon as continuous, screw-like threading, the orientation of that threading and said auger being such that rotation of said auger drives said matter toward said flow gates, said auger including a first drive means for causing rotation of said auger and a second drive means for causing said auger to be movable along the length of said bin, said auger including a hollow portion, and said first drive means being disposed within said hollow portion, a movable cam member engagable with said flow gates to selectively open and close said flow gates to permit matter to move between said bin and said conveyor, said flow gates each including a pair of separately openable, opposed gate doors, each of those doors having a projection attached thereto which is configured to be engagable with said cam member, and said cam member being synchronized with movement of said auger along the length of said bin such that each of said flow gates is opened as said auger moves to that flow gate and closes after said auger moves past that flow gate.

* * * * *